(12) United States Patent
Salgues et al.

(10) Patent No.: US 12,467,557 B2
(45) Date of Patent: Nov. 11, 2025

(54) CABLE SUPPORT DEVICE THAT IS EASY TO INSTALL AND METHOD FOR FASTENING CABLES WITH THE AID OF THE SUPPORT DEVICE

(71) Applicant: Airbus Operations (S.A.S.), Toulouse (FR)

(72) Inventors: Patrick Salgues, Toulouse (FR); Benjamin Thubert, Toulouse (FR); Julien Hervier, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 50 days.

(21) Appl. No.: 18/746,789

(22) Filed: Jun. 18, 2024

(65) Prior Publication Data
US 2024/0426400 A1    Dec. 26, 2024

(30) Foreign Application Priority Data
Jun. 20, 2023 (FR) .................................. 2306381

(51) Int. Cl.
*F16L 3/127* (2006.01)
*F16L 3/123* (2006.01)

(52) U.S. Cl.
CPC .............. *F16L 3/127* (2013.01); *F16L 3/123* (2013.01)

(58) Field of Classification Search
CPC .................................. F16L 3/127; F16L 3/123
See application file for complete search history.

(56) References Cited

U.S. PATENT DOCUMENTS

| 5,443,232 A * | 8/1995 | Kesinger | H02G 3/263 |
| | | | 248/62 |
| 9,695,961 B2 * | 7/2017 | Michelet | F16L 3/1222 |
| 2021/0273435 A1 * | 9/2021 | Thomas | H02G 3/32 |

FOREIGN PATENT DOCUMENTS

| DE | 102005012610 A1 * | 9/2006 | ............... H02G 3/32 |
| EP | 1276198 A2 | 1/2003 | |
| EP | 3761468 A1 * | 1/2021 | ........... H02G 3/0608 |
| GB | 2486682 A * | 6/2012 | ........... H02G 3/0431 |

OTHER PUBLICATIONS

Kitplanes online article "Tidy Up with Adel Clamps" by Jon Croke, dated Feb. 16, 2021, https://www.kitplanes.com/tidy-up-with-adel-clamps/ (Year: 2021).*

* cited by examiner

*Primary Examiner* — Terrell L McKinnon
*Assistant Examiner* — Ding Y Tan
(74) *Attorney, Agent, or Firm* — KDW Firm PLLC

(57) ABSTRACT

A support device includes a profiled element having at least one passage hole passing transversely through the profiled element, a fastening support, integral with the profiled element, to fasten the support device to a primary structure, at least one clamping element having a clamp to receive at least one cable and at least one fastening element to fasten the clamping element or elements to the profiled element. The device facilitates the fastening of cables to a primary structure.

10 Claims, 4 Drawing Sheets

CABLE SUPPORT DEVICE THAT IS EASY TO INSTALL AND METHOD FOR FASTENING CABLES WITH THE AID OF THE SUPPORT DEVICE

TECHNICAL FIELD

The disclosure herein relates to a cable support device that is easy to install.

BACKGROUND

The majority of vehicles, such as an aircraft, comprise cables that must be held on or fastened to a fixed structure in order for them to remain substantially immobile.

There are already support devices that hold or fasten cables. However, these support devices are laborious to install, particularly in locations that are difficult to access.

The existing support devices are therefore not entirely satisfactory.

SUMMARY

The object of the disclosure herein is to overcome the drawbacks of the support devices that already exist.

To this end, it relates to a cable support device.

According to the disclosure herein, the support device comprises:

- a profiled element extending along a first longitudinal axis between a first end of the profiled element and a second end of the profiled element, the profiled element having at least one passage hole passing transversely through the profiled element between two first opposite faces of the profiled element along a second longitudinal axis perpendicular to the first longitudinal axis;
- a fastening support integral with the profiled element at the first end of the profiled element, the fastening support being intended to fasten the support device to a primary structure;
- at least one clamping element comprising:
- a stem extending along a third longitudinal axis between a first end of the stem and a second end of the stem, the stem being intended to be inserted in a passage hole by the first end of the stem,
- a clamp integral with the stem at the second end of the stem, the clamp being intended to receive and hold at least one cable;
- at least one fastening element intended to fasten the clamping element or each of the clamping elements to the profiled element when the stem is inserted to a desired insertion depth in a passage hole.

Thus, by virtue of the clamping element at which the cables can be received, it is possible for the clamping element to be fastened easily by insertion of the clamping element in a passage hole of the profiled element. It is no longer necessary to hold the cables at the time of their fastening because they are already held by the clamping element.

According to a preferred embodiment, the profiled element comprises a longitudinal hole extending along the first longitudinal axis between the first end of the profiled element and the second end of the profiled element, the longitudinal hole being open at least at the second end of the profiled element, the longitudinal hole being configured to receive the stem of a clamping element, liable to be inserted in the longitudinal hole at the second end of the profiled element, a fastening element is intended to fasten a clamping element to the profiled element when the stem of the clamping element is inserted to a desired insertion depth in the longitudinal hole.

In addition, the profiled element comprises at least one first fastening hole passing transversely through the profiled element between two second opposite faces of the profiled element along a fourth longitudinal axis perpendicular to the first longitudinal axis of the profiled element and to the second longitudinal axis of the passage hole or holes, the first fastening hole or each first fastening hole passing respectively through a passage hole of the profiled element, the stem of the clamping element or elements has at least one second fastening hole passing transversely through the stem along a fifth longitudinal axis perpendicular to the third longitudinal axis of the stem, the fastening element or each of the fastening elements being configured to be inserted in a first fastening hole of the profiled element and a second fastening hole of the stem when the first fastening hole and the second fastening hole are opposite one another after insertion of the stem to a desired insertion depth in a passage hole of the profiled element or after insertion of the stem to a desired insertion depth in the longitudinal hole of the profiled element.

According to a preferred embodiment, the fastening element corresponds to a quarter-turn screw, the first fastening hole or holes and the second fastening hole or holes having a cross section having a form that allows, for the one part, the quarter-turn screw to pass through the first fastening hole or holes and through the second fastening hole or holes after insertion of the stem to a desired insertion depth in a passage hole of the profiled element or after insertion of the stem to a desired insertion depth in the longitudinal hole of the profiled element, and for the other part, the passage of the quarter-turn screw to be blocked when the screw has been rotated a quarter turn after the quarter-turn screw has passed through the first fastening hole or holes and the second fastening hole or holes.

Furthermore, the profiled element has an oblong opening passing through the profiled element between the two second opposite faces of the profiled element along the fourth longitudinal axis, the oblong opening extending parallel to the first longitudinal axis between the first end and the second end of the profiled element.

Furthermore, the clamp of the clamping element or elements has a U shape, the U shape comprising a bottom joining free ends of the U shape, the stem of the clamping element or elements being integral with the clamp at the bottom of the U shape.

In addition, the clamping element has a first opening between the stem and the clamp and two second openings respectively at the two free ends of the U shape, the first opening and the two second openings being intended for the passage of a clamping collar for fastening the cable or cables to the clamp.

Furthermore, the fastening support has a fastening surface intended to be pressed against the primary structure to which the support device is intended to be fastened, the fastening surface and the first longitudinal axis of the profiled element forming an angle of between 0° and 90°.

The disclosure herein also relates to a method for fastening at least one cable to a primary structure with the aid of a support device as specified above.

According to the disclosure herein, the method comprises the following steps:
- a step of fastening the cable or cables to the clamp of at least one clamping element,
- a step of fastening the fastening support to the primary structure,
- a step of inserting the stem of at least one clamping element into at least one passage hole of the profiled element,
- a step of fastening the clamping element or elements to the profiled element at a desired insertion depth.

According to a preferred embodiment, the method further comprises:
- a step of inserting the stem of at least one clamping element into the longitudinal hole of the profiled element,
- a step of fastening the clamping element to the profiled element at a desired insertion depth in the longitudinal hole.

BRIEF DESCRIPTION OF THE DRAWINGS

The appended figures will make it easy to understand how the disclosure herein may be implemented. In these figures, identical reference signs denote similar elements.

DETAILED DESCRIPTION

Figure 1:
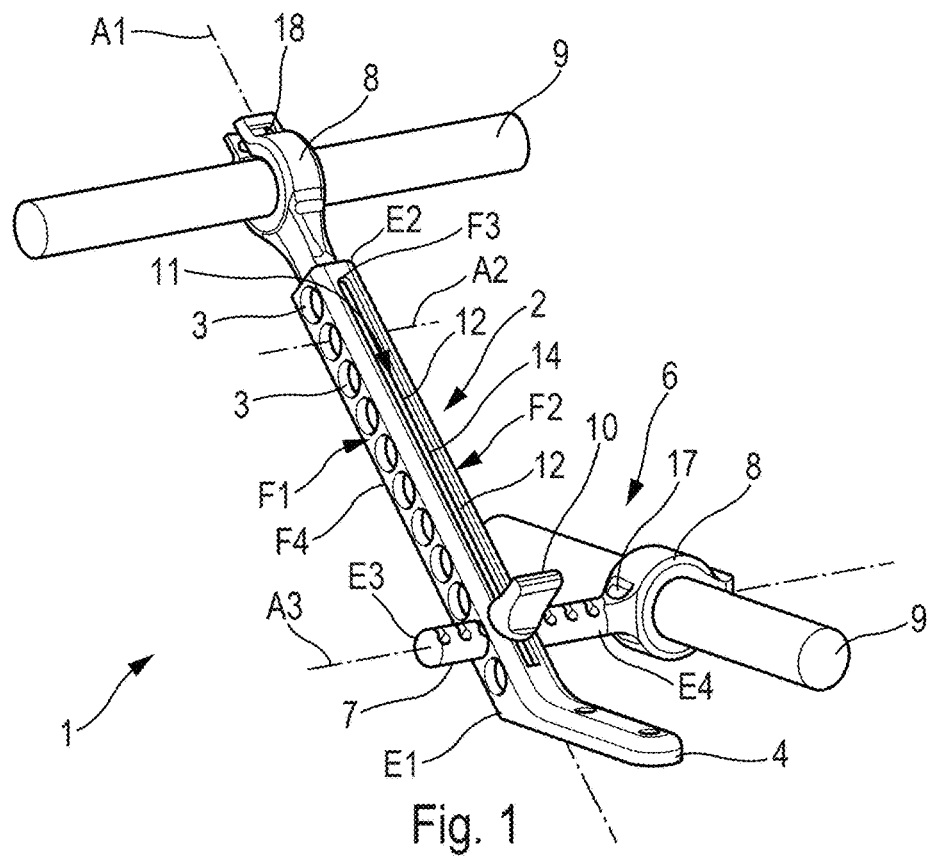
FIG. 1 shows a perspective view of the support device to which cables are fastened.
Figure 2:
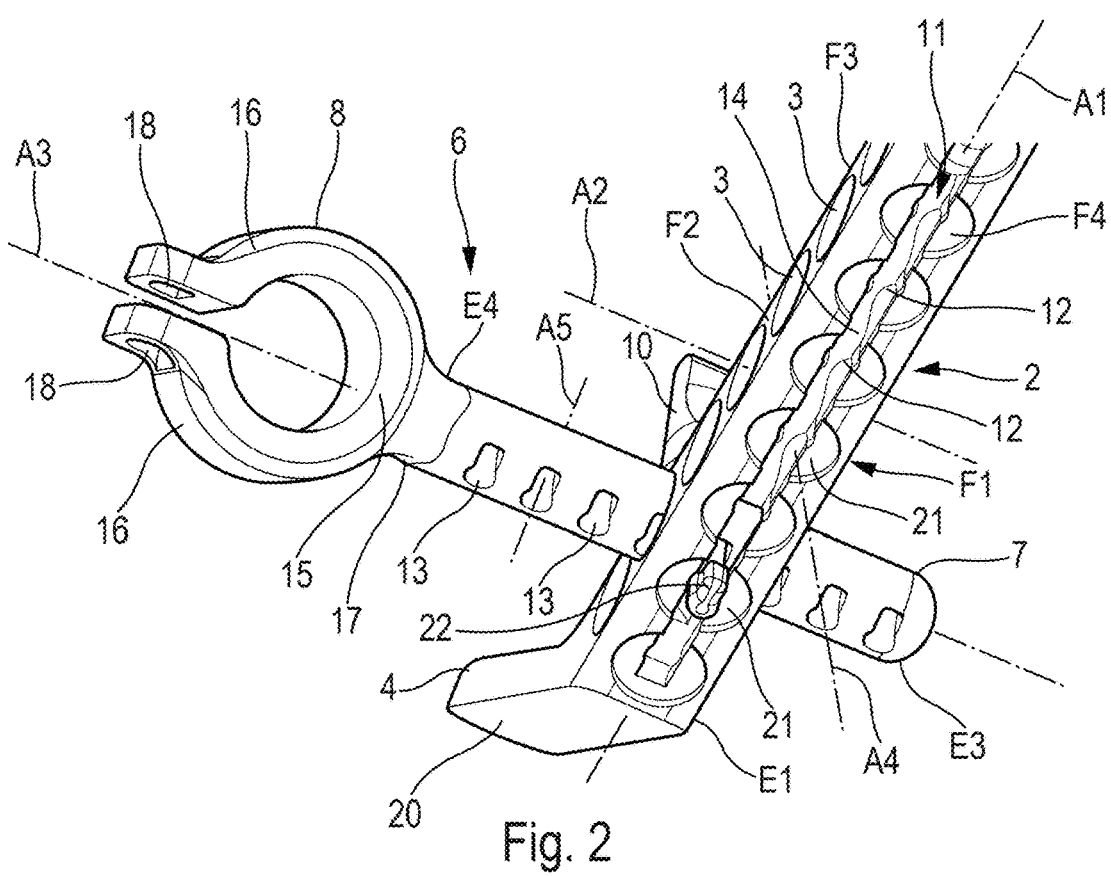
FIG. 2 shows a perspective view of a clamping element inserted in a passage hole of the profiled element of the support device.
Figure 3:
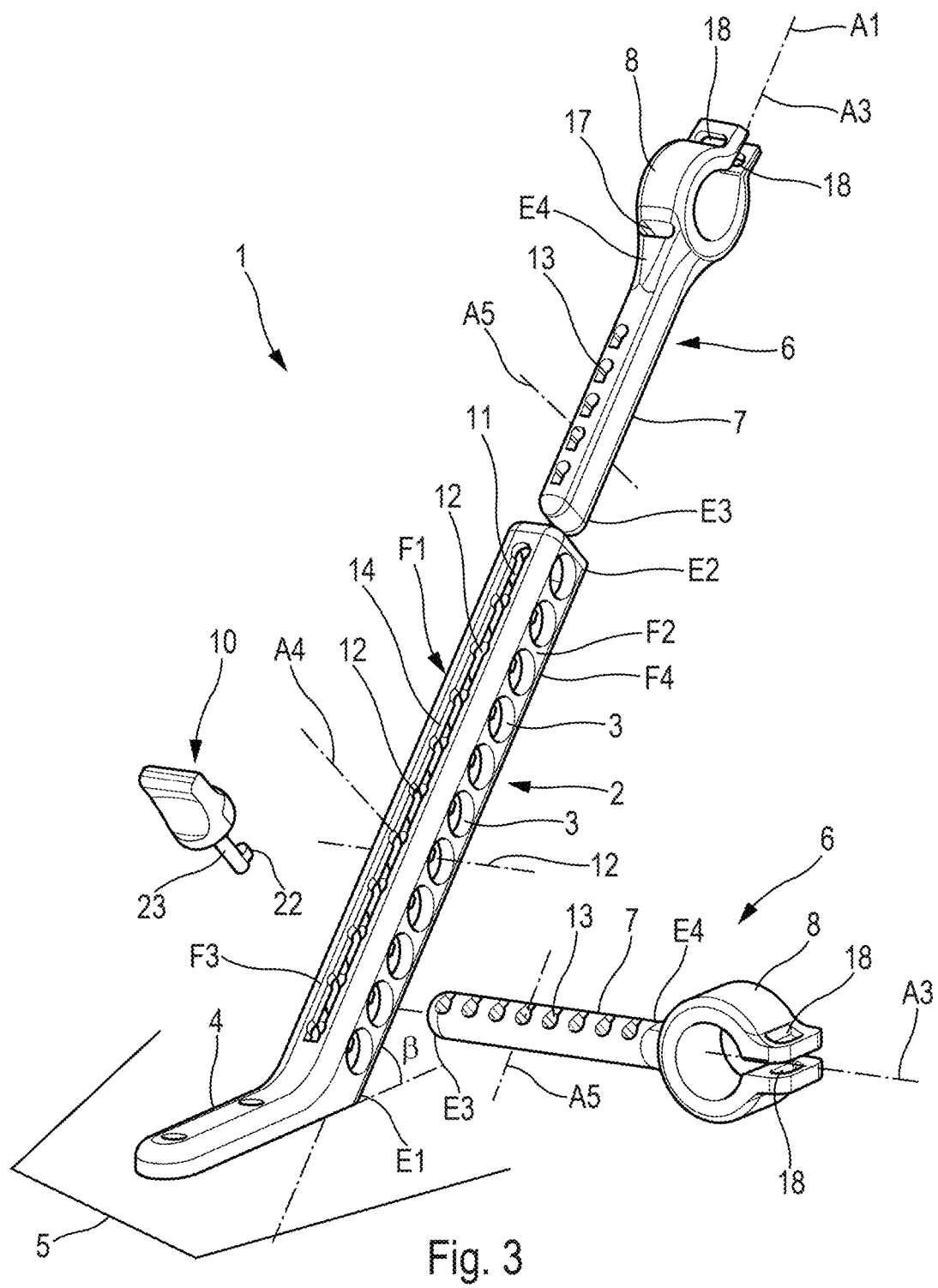
FIG. 3 shows an exploded perspective view of the support device.

The device 1 for supporting cables 9 is shown in FIG. 1 to FIG. 3.

The support device 1 is intended to fasten a cable 9 or a bundle of cables to a primary structure 5 or to hold them on a primary structure 5. This support device 1 may also be intended to fasten one or more tubes together.

Non-limitingly, for example on board an aircraft, the primary structure 5 may correspond to a partition or a floor of the aircraft.

As shown in FIG. 1 and FIG. 3, the support device 1 comprises a profiled element 2, a fastening support 4, at least one clamping element 6 and at least one fastening element 10. A clamping element 6 is an element for holding at least one cable 9.

The profiled element 2 extends along a first longitudinal axis A1 between a first end E1 of the profiled element 2 and a second end E2 of the profiled element 2.

The profiled element 2 has at least one passage hole 3 passing transversely through the profiled element 2 between the two first opposite faces F1, F2 of the profiled element 2 along a second longitudinal axis A2 perpendicular to the first longitudinal axis A1.

Preferably, the profiled element 2 has a plurality of passage holes 3 distributed regularly parallel to the first longitudinal axis A1 between the two first opposite faces F1 and F2. In the example shown in FIG. 1 and FIG. 3, the profiled element 2 has eleven passage holes 3.

The fastening support 4 is integral with the profiled element 2 at the first end E1 of the profiled element 2. The fastening support 4 is intended to fasten the support device 1 to the primary structure 5.

According to one embodiment shown in FIG. 1 to FIG. 3, the fastening support 4 has a fastening surface 20 intended to be pressed against the primary structure 5 to which the support device 1 is intended to be fastened. The fastening surface 20 and the first longitudinal axis A1 of the profiled element form an angle $\beta$ of between 0° and 180°. Preferably, the angle $\beta$ is equal to 45°.

Preferably, the profiled element 2 and the fastening support 4 are in one piece. Non-limitingly, the profiled element 2 and the fastening support 4 are made of a thermoformed material, such as a plastics material.

The clamping element or elements 6 comprise a stem 7 and a clamp 8.

The stem 7 extends along a third longitudinal axis A3 between a first end E3 of the stem 7 and a second end E4 of the stem 7. The stem 7 is intended to be inserted in a passage hole 3 by the first end E3 of the stem 7.

The clamp 8 is integral with the stem 7 at the second end E4 of the stem 7. The clamp 8 is intended to receive and hold at least one cable 9.

Preferably, the stem 7 and the clamp 8 are in one piece. Non-limitingly, the stem 7 and the clamp 8 are made of a thermoformed material, such as a plastics material.

The fastening element or elements 10 are intended to fasten the clamping element 6 or each of the clamping elements 6 to the profiled element 2 when the stem 7 is inserted to a desired insertion depth in a passage hole 3.

If the profiled element 2 comprises a plurality of passage holes 3, each of the passage holes 3 allows a clamping element 6 to be fastened to the profiled element 2 in the passage hole 3 at a position along the profiled element 2 that is defined by the position of the passage hole 3 with respect to the other passage holes 3. The number of passage holes 3 corresponds to the number of possible positions for a clamping element 6 along the profiled element 2. In the example shown in FIG. 1 and FIG. 3, in which the profiled element 2 has eleven passage holes 3, a clamping element 6 therefore has eleven possible fastening positions along the profiled element 2.

According to a preferred embodiment, the profiled element 2 comprises a longitudinal hole 11 which extends along the first longitudinal axis A1 between the first end E1 of the profiled element 2 and the second end E2 of the profiled element 2. The longitudinal hole 11 is open at least at the second end E2 of the profiled element 2.

The longitudinal hole 11 is configured to receive the stem 7 of a clamping element 6, liable to be inserted in the longitudinal hole 11 at the second end E2 of the profiled element 2. A fastening element 10 is intended to fasten a clamping element 6 to the profiled element 2 when the stem 7 of the clamping element 6 is inserted to a desired insertion depth in the longitudinal hole 11.

The profiled element 2 may comprise at least one first fastening hole 12 passing transversely through the profiled element 2 between two second opposite faces F3 and F4 of the profiled element 2 along a fourth longitudinal axis A4 perpendicular to the first longitudinal axis A1 of the profiled element 2 and to the second longitudinal axis A2 of the passage hole or holes 3 (FIG. 2 and FIG. 3). The first fastening hole 12 or each first fastening hole 12 passes respectively through a passage hole 3 of the profiled element 2. Advantageously, the number of first fastening holes 12 is equal to the number of passage holes 3.

The stem 7 of the clamping element or elements 6 has at least one second fastening hole 13 passing transversely through the stem 7 along a fifth longitudinal axis A5 perpendicular to the third longitudinal axis A3 of the stem 7 (FIG. 3). Preferably, the stem 7 of a clamping element 6 has a plurality of second fastening holes 13 distributed regularly parallel to the third longitudinal axis A3.

The fastening element 10 or each of the fastening elements 10 is configured to be inserted in a first fastening hole 12 of the profiled element 2 and a second fastening hole 13 of the stem 7 when the first fastening hole 12 and the second fastening hole 13 are opposite one another after insertion of the stem 7 to a desired insertion depth in a passage hole 3 of the profiled element 2 or after insertion of the stem 7 to a desired insertion depth in the longitudinal hole 11 of the profiled element 2.

If the stem 7 comprises a plurality of second fastening holes 13, each of the second fastening holes 13 allows the clamping element 6 to be fastened to the profiled element 2 in the passage hole 3 at an insertion depth defined by the position of the second fastening hole 13 with respect to the other second fastening holes 13. In the example shown in FIG. 1 to FIG. 3, the stem 7 comprises eight second fastening holes 13 for one of the clamping elements 6 shown. This clamping element 6, which is intended to be inserted in a passage hole 3, therefore has eight possible insertion depths through the passage hole 3 of the profiled element 2. In this example, the other clamping element 6, which is intended to be inserted in the longitudinal hole 11 of the profiled element, comprises five second fastening holes 13. This clamping element 6 therefore has five possible insertion depths in the longitudinal hole 11 of the profiled element.

According to a preferred embodiment, the fastening element 10 corresponds to a quarter-turn screw, as shown in FIG. 1 to FIG. 3. The first fastening hole or holes 12 and the second fastening hole or holes 13 have a cross section having a form that allows, for the one part, the quarter-turn screw to pass through the first fastening hole or holes 12 and through the second fastening hole or holes 13 after insertion of the stem 7 to a desired insertion depth in a passage hole 3 of the profiled element 2 or after insertion of the stem 7 to a desired insertion depth in the longitudinal hole 11 of the profiled element 2 such that the first fastening hole 12 and the second fastening hole 13 are opposite one another.

For the other part, the first fastening hole or holes 12 and the second fastening hole or holes 13 each have a cross section having a form that allows the passage of the quarter-turn screw to be blocked when the screw has been rotated a quarter turn after the quarter-turn screw has passed through the first fastening hole or holes 12 and the second fastening hole or holes 13.

As shown in FIG. 2 and FIG. 3, the quarter-turn screw may comprise a finger 22 perpendicular to the body 23 of the quarter-turn screw. The finger 22 enables the blocking of the passage of the quarter-turn screw. Thus, the cross section of the first fastening hole or holes 12 and of the second fastening hole or holes 13 has a form that allows the passage of the finger when the finger is parallel to the first longitudinal axis A1.

As shown in FIG. 2, the face F4 of the profiled element 2 may have a circular recess 21 around each outlet of at least one first fastening hole 12. This recess 21 allows the finger 22 to rotate about the body 23 of the quarter-turn screw in order to block the passage of the quarter-turn screw when the screw has been rotated a quarter turn.

The profiled element 2 may have an oblong opening 14 passing through the profiled element 2 between the two second opposite faces F3 and F4 of the profiled element 2 along the fourth longitudinal axis A4. The oblong opening 14 extends parallel to the first longitudinal axis A1 between the first end E1 and the second end E2 of the profiled element 2. This oblong opening 14 makes it possible to save on the material for producing the profiled element 2.

According to one embodiment, the clamp 8 of the clamping element or elements 6 has a U shape. The U shape comprises a bottom 15 joining the free ends 16 of the U shape. The stem 7 of the clamping element or elements 6 is integral with the clamp 8 at the bottom 15 of the U shape.

Advantageously, the clamping element 6 has a first opening 17 between the stem 7 and the clamp 8 and two second openings 18 respectively at the two free ends 16 of the U shape. The first opening 17 and the two second openings 18 are intended for the passage of a clamping collar 19 (FIG. 5) for fastening the cable or cables 9 to the clamp 8.

Figure 4:
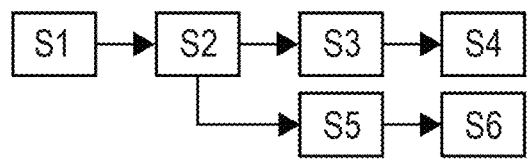
FIG. 4 schematically shows the method for fastening at least one cable to a primary structure with the aid of the support device.

The disclosure herein also relates to a method for fastening at least one cable 9 to a primary structure 5 with the aid of the support device 1 (FIG. 4).

Figure 5:
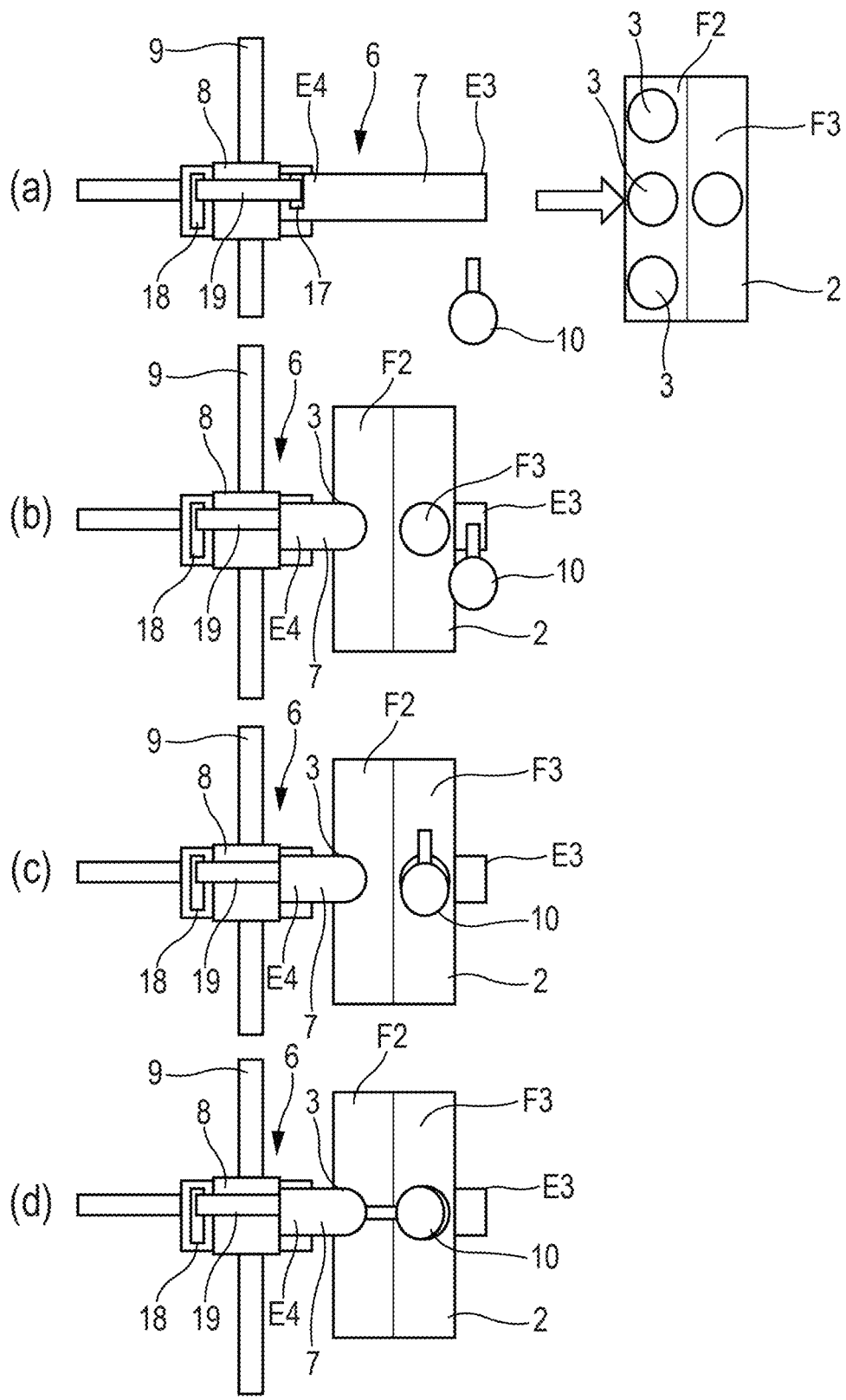
FIG. 5 contains four depictions (a), (b), (c), (d) of method steps.

The method comprises the following steps:
- a step S1 of fastening the cable or cables 9 to the clamp 8 of at least one clamping element 6 ((a) in FIG. 5),
- a step S2 of fastening the fastening support 4 to the primary structure 5,
- a step S3 of inserting the stem 7 of at least one clamping element 6 into at least one passage hole 3 of the profiled element 2 ((b) in FIG. 5),
- a step S4 of fastening the clamping element or elements 6 to the profiled element 2 at a desired insertion depth ((c) and (d) in FIG. 5).

According to a preferred embodiment, the method further comprises the following steps which follow steps S1 and S2:
- a step S5 of inserting the stem 7 of a clamping element 6 into the longitudinal hole 11 of the profiled element 2,
- a step S6 of fastening the clamping element 6 to the profiled element 2 at a desired insertion depth in the longitudinal hole 11.

Steps S5 and S6 may be implemented in parallel with steps S3 and S4.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cable support device comprising:
   a profiled element extending along a first longitudinal axis between a first end of the profiled element and a second end of the profiled element, the profiled element having at least one passage hole passing transversely through the profiled element between two first opposite faces of the profiled element along a second longitudinal axis perpendicular to the first longitudinal axis;

a fastening support integral with the profiled element at the first end of the profiled element, the fastening support configured to fasten the support device to a primary structure;

at least one clamping element comprising:
- a stem extending along a third longitudinal axis between a first end of the stem and a second end of the stem, the stem being insertable in a passage hole by the first end of the stem;
- a clamp integral with the stem at the second end of the stem, the clamp being configured to receive and hold at least one cable;

at least one fastening element to fasten the clamping element or each of the clamping elements to the profiled element when the stem is inserted to a desired insertion depth in a passage hole.

2. The device according to claim 1, wherein the profiled element comprises a longitudinal hole extending along the first longitudinal axis between the first end of the profiled element and the second end of the profiled element, the longitudinal hole being open at least at the second end of the profiled element, the longitudinal hole being configured to receive the stem of a clamping element, to be inserted in the longitudinal hole at the second end of the profiled element, and comprising a fastening element to fasten a clamping element to the profiled element when the stem of the clamping element is inserted to a desired insertion depth in the longitudinal hole.

3. The device according to claim 1,
wherein the profiled element comprises at least one first fastening hole passing transversely through the profiled element between two second opposite faces of the profiled element along a fourth longitudinal axis perpendicular to the first longitudinal axis of the profiled element and to the second longitudinal axis of the passage hole or holes, the first fastening hole or each first fastening hole passing respectively through a passage hole of the profiled element, wherein the stem of the clamping element or elements has at least one second fastening hole passing transversely through the stem along a fifth longitudinal axis perpendicular to the third longitudinal axis of the stem, the fastening element or each of the fastening elements being insertable in a first fastening hole of the profiled element and a second fastening hole of the stem when the first fastening hole and the second fastening hole are opposite one another after insertion of the stem to a desired insertion depth in a passage hole of the profiled element or after insertion of the stem to a desired insertion depth in a longitudinal hole of the profiled element.

4. The device according to claim 1,
wherein the fastening element comprises a quarter-turn screw, the first fastening hole or holes and the second fastening hole or holes having a cross section having a form that allows:
- for one part, the quarter-turn screw to pass through the first fastening hole or holes and through the second fastening hole or holes after insertion of the stem to a desired insertion depth in a passage hole of the profiled element or after insertion of the stem to a desired insertion depth in a longitudinal hole of the profiled element; and
- for another part, passage of the quarter-turn screw to be blocked when the screw has been rotated a quarter turn after the quarter-turn screw has passed through the first fastening hole or holes and the second fastening hole or holes.

5. The device according to claim 2, wherein the profiled element has an oblong opening passing through the profiled element between the two second opposite faces of the profiled element along the fourth longitudinal axis, the oblong opening extending parallel to the first longitudinal axis between the first end and the second end of the profiled element.

6. The device according to claim 1, wherein the clamp of the clamping element or elements has a U shape, the U shape comprising a bottom joining free ends of the U shape, the stem of the clamping element or elements being integral with the clamp at the bottom of the U shape.

7. The device according to claim 6, wherein the clamping element has a first opening between the stem and the clamp and two second openings respectively at the free ends of the U shape, the first opening and the two second openings being configured for passage of a clamping collar for fastening the cable or cables to the clamp.

8. The device according to claim 1, wherein the fastening support has a fastening surface to be pressed against the primary structure to which the support device is to be fastened, the fastening surface and the first longitudinal axis of the profiled element forming an angle of between 0° and 90°.

9. A method for fastening at least one cable to a primary structure with aid of the support device according to claim 1, the method comprising:
- fastening the cable or cables to the clamp of at least one clamping element;
- fastening the fastening support to the primary structure;
- inserting the stem of at least one clamping element into at least one passage hole of the profiled element; and
- fastening the clamping element or elements to the profiled element at a desired insertion depth.

10. The method according to claim 9, comprising:
- inserting the stem of at least one clamping element into a longitudinal hole of the profiled element; and
- fastening the clamping element to the profiled element at a desired insertion depth in the longitudinal hole.

\* \* \* \* \*